(12) United States Patent
Quadir et al.

(10) Patent No.: US 12,495,439 B2
(45) Date of Patent: Dec. 9, 2025

(54) NETWORK NODE AND METHOD FOR PROCESSING PREAMBLES IN A RANDOM ACCESS CHANNEL

(71) Applicant: Telefonaktiebolaget LM Ericsson (publ), Stockholm (SE)

(72) Inventors: Ahmedul Quadir, Sollentuna (SE); David Better, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 368 days.

(21) Appl. No.: 18/011,185

(22) PCT Filed: Jun. 18, 2020

(86) PCT No.: PCT/SE2020/050635
§ 371 (c)(1),
(2) Date: Dec. 18, 2022

(87) PCT Pub. No.: WO2021/256972
PCT Pub. Date: Dec. 23, 2021

(65) Prior Publication Data
US 2023/0224954 A1  Jul. 13, 2023

(51) Int. Cl.
*H04W 74/00* (2009.01)
*H04L 5/00* (2006.01)
*H04W 74/0833* (2024.01)

(52) U.S. Cl.
CPC ......... *H04W 74/002* (2013.01); *H04L 5/0035* (2013.01); *H04L 5/0094* (2013.01); *H04W 74/0833* (2013.01)

(58) Field of Classification Search
CPC ............ H04W 74/002; H04W 74/0833; H04L 5/0035; H04L 5/0094
See application file for complete search history.

(56) References Cited

U.S. PATENT DOCUMENTS

| | | | |
|---|---|---|---|
| 2012/0002617 A1* | 1/2012 | Vujcic | H04W 74/0833 370/329 |
| 2016/0278128 A1* | 9/2016 | Krishnamurthy | H04B 1/3816 |

(Continued)

OTHER PUBLICATIONS

Search Report, European Patent Application No. 20940821.0, mailed Feb. 21, 2024, 15 pages.

(Continued)

*Primary Examiner* — Nizam U Ahmed
(74) *Attorney, Agent, or Firm* — Sage Patent Group

(57) ABSTRACT

A network node is configured with a common preamble format for a shared spectrum comprising a first Radio Access Technology (RAT) and a second RAT. The RACH procedure is common for the first and second RAT. The network node configures the network node with a common preamble location in time and frequency for the first and second RAT. The network node configures the UE with a preamble group comprising a number of preambles distributed between the first and second RAT for the common preamble format. When receiving from the UE, a first RACH message comprising a first preamble at the common preamble location according to the UE configuring, the network node decides whether the first RAT, the second RAT, or both the first and second RAT, shall be used for a second RACH message to be sent to the UE.

17 Claims, 8 Drawing Sheets

(56) References Cited

U.S. PATENT DOCUMENTS

2016/0295420 A1   10/2016  Luo et al.
2018/0316481 A1*  11/2018  Montojo ............... H04L 5/0007
2020/0146055 A1    5/2020  Lei et al.
2020/0154283 A1    5/2020  Yeramalli et al.

OTHER PUBLICATIONS

International Search Report and Written Opinion of the International Searching Authority, PCT/SE2020/050635, mailed Apr. 26, 2021, 12 pages.

* cited by examiner

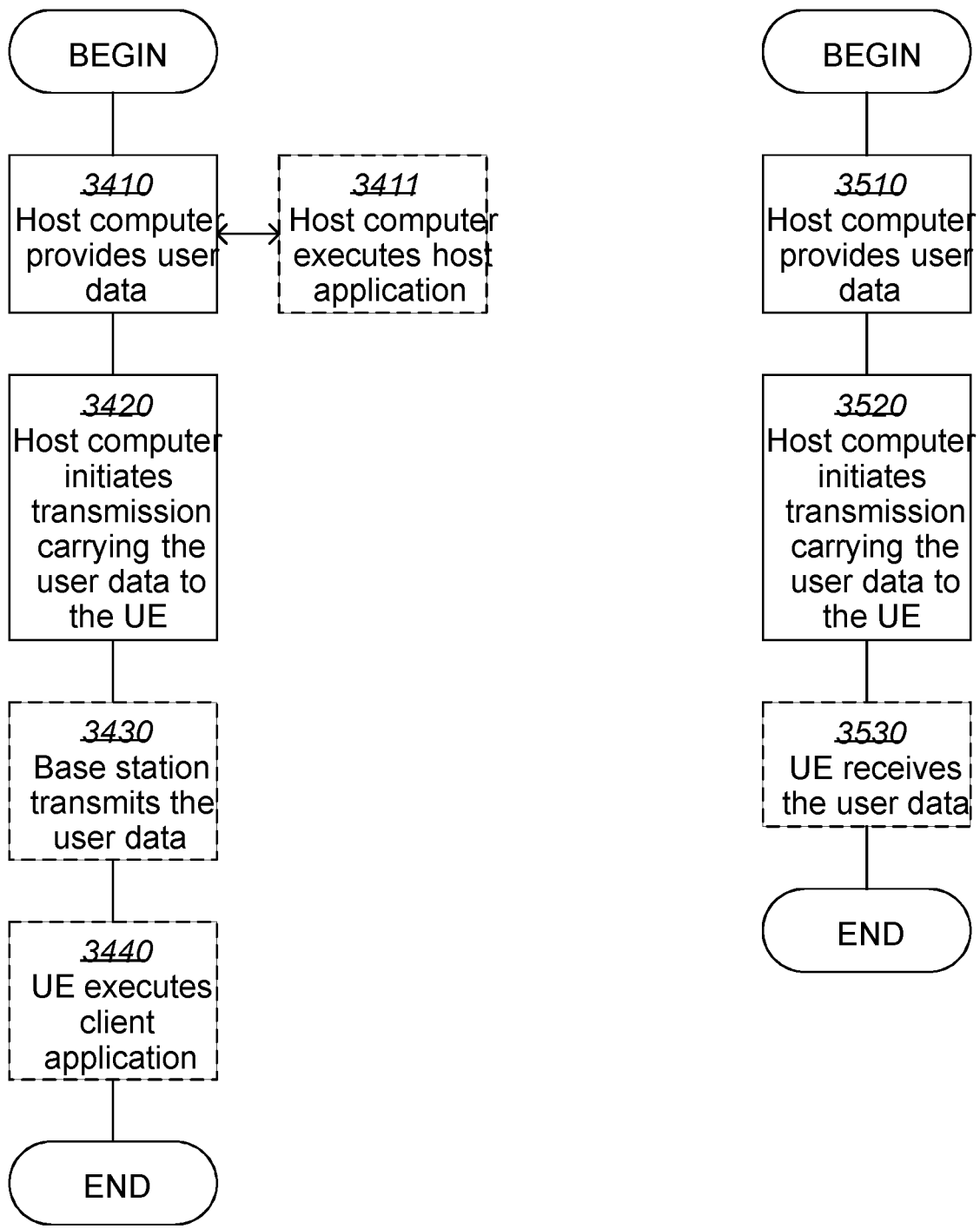

NETWORK NODE AND METHOD FOR PROCESSING PREAMBLES IN A RANDOM ACCESS CHANNEL

CROSS REFERENCE TO RELATED APPLICATIONS

This application is a 35 U.S.C. § 371 national stage application of PCT International Application No. PCT/SE2020/050635 filed on Jun. 18, 2020, the disclosure and content of which is incorporated by reference herein in its entirety.

TECHNICAL FIELD

Embodiments herein relate to a network node and a method performed therein. In particular, embodiments herein relate to processing preambles from a User Equipment (UE) in a Random Access Channel (RACH).

BACKGROUND

In a typical wireless communication network, wireless devices, also known as wireless communication devices, mobile stations, stations (STA) and/or User Equipment (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR) or Next Generation (NG). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

Spectrum Sharing:

5G will be introduced on both new and legacy spectrum bands. This requires functionality that enables operators to plan its evolution of network assets including both spectrum bands and technologies, as well as, allow for a seamless roll-out of 5G with optimal end-user performance. A Dynamic Spectrum Sharing (DSS) solution referred to as Ericsson Spectrum Sharing (ESS) may give the possibility to intelligently, flexibly and quickly introduce and add 5G within existing 4G carriers, e.g. introduce 5G on low/mid bands for wide area coverage and outside in coverage. ESS software may dynamically share spectrum between 4G and 5G carriers based on traffic demand. The switch between carriers happens within milliseconds, which minimizes spectrum wastage and allows for best end-user performance.

Initial Access Random Access Channel (RACH) Process:

In communications, an important precondition is to establish timing synchronization between a gNB and a UE, and establish a connection.

The RACH procedure is similar between NR and LTE. There are many situations that RACH process triggers, such as e.g.:

Initial access from RRC idle

RRC Connection re-establishment procedure

Handover

Transition from RRC inactivity

To establish time alignment at SCell addition

Request for other SI

Beam failure recovery

RACH procedure is performed as following:

UE—>gNB/eNB: send RACH preamble, called msg1 gNB/eNB—>UE: send Random access response, called msg2

UE—>gNB/eNB: send L2/L3 msg, called msg3

RACH Preamble

According to 3GPP 33.211 LTE preamble formats describe as below:

| Preamble format | $T_{CP}$ | $T_{SEQ}$ |
| --- | --- | --- |
| 0 | $3168 \cdot T_S$ | $2457 \cdot T_S$ |
| 1 | $21024 \cdot T_S$ | $24576 \cdot T_S$ |
| 2 | $6240 \cdot T_S$ | $2 \cdot 24576 \cdot T_S$ |
| 3 | $21024 \cdot T_S$ | $2 \cdot 24576 \cdot T_S$ |
| 4 (see Note) | $448 \cdot T_S$ | $4096 \cdot T_S$ |

NOTE:
→ Frame structure type 2 and special subframe configurations with UpPTS lengths $4384 \cdot T_S$ and $5120 \cdot T_S$ only assuming that the number of additional SC-FDMA symbols in UpPTS X in Table 4.2-1 is 0.

Wherein $T_{CP}$ means length of Cyclic prefix, $T_{SEQ}$ means length of sequence, $T_S$ means one sample (1/30.72=0.03255 us), Up PTS means Uplink Pilot Time Slot and SC-FDMA means Single Carrier Frequency Division Multiple Access.

3GPP 38.211 NR preamble describe as below:

Physical Random Access Channel (PRACH) Preamble Formats for $L_{RA}=839$ and $\Delta f^{RA} \in \{1.25, 5\}$ kHz.

| Format | $L_{RA}$ | $\Delta f^{RA}$ | $N_u$ | $N_{CP}^{RA}$ | Support for restricted sets |
|---|---|---|---|---|---|
| 0 | 839 | 1.25 kHz | 24576 k | 3168 k | Type A, Type B |
| 1 | 839 | 1.25 kHz | 2 · 24576 k | 21024 k | Type A, Type B |
| 2 | 839 | 1.25 kHz | 4 · 24576 k | 4688 k | Type A, Type B |
| 3 | 839 | 5 kHz | 4 · 6144 k | 3168 k | Type A, Type B |

Wherein herein $L_{RA}$ means PRACH preamble sequence length, $\Delta f^{RA}$ means subcarrier spacing of PRACH preamble, $N_u$ means length of sequence, $N_{CP}^{RA}$ means length of cyclic prefix, Type A and Type B refers to different sets of generated preambles according to 3GPP TS38.211 Ch.6.3.3.1.

Preamble formats for $L_{RA}=139$ and $\Delta f^{RA}=15 \cdot 2^\mu$ kHz where $\mu \in \{0,1,2,3\}$.

| Format | $L_{RA}$ | $\Delta f^{RA}$ | $N_u$ | $N_{CP}^{RA}$ | Support for restricted sets |
|---|---|---|---|---|---|
| A1 | 139 | $15 \cdot 2^\mu$ kHz | $2 \cdot 2048 \text{ k} \cdot 2^{-\mu}$ | $288 \text{ k} \cdot 2^{-\mu}$ | — |
| A2 | 139 | $15 \cdot 2^\mu$ kHz | $4 \cdot 2048 \text{ k} \cdot 2^{-\mu}$ | $576 \text{ k} \cdot 2^{-\mu}$ | — |
| A3 | 139 | $15 \cdot 2^\mu$ kHz | $6 \cdot 2048 \text{ k} \cdot 2^{-\mu}$ | $864 \text{ k} \cdot 2^{-\mu}$ | — |
| B1 | 139 | $15 \cdot 2^\mu$ kHz | $2 \cdot 2048 \text{ k} \cdot 2^{-\mu}$ | $216 \text{ k} \cdot 2^{-\mu}$ | — |
| B2 | 139 | $15 \cdot 2^\mu$ kHz | $4 \cdot 2048 \text{ k} \cdot 2^{-\mu}$ | $360 \text{ k} \cdot 2^{-\mu}$ | — |
| B3 | 139 | $15 \cdot 2^\mu$ kHz | $6 \cdot 2048 \text{ k} \cdot 2^{-\mu}$ | $504 \text{ k} \cdot 2^{-\mu}$ | — |
| B4 | 139 | $15 \cdot 2^\mu$ kHz | $12 \cdot 2048 \text{ k} \cdot 2^{-\mu}$ | $936 \text{ k} \cdot 2^{-\mu}$ | — |
| C0 | 139 | $15 \cdot 2^\mu$ kHz | $2048 \text{ k} \cdot 2^{-\mu}$ | $1240 \text{ k} \cdot 2^{-\mu}$ | — |
| C2 | 139 | $15 \cdot 2^\mu$ kHz | $4 \cdot 2048 \text{ k} \cdot 2^{-\mu}$ | $2048 \text{ k} \cdot 2^{-\mu}$ | — |

There are up to 64 preambles defined in each time-frequency space allocated for LTE or NR PRACH. In current Spectrum Sharing (SS) deployment, PRACH resources between LTE and NR are separated in time and/or in frequency. This creates overhead in PRB usage. Another disadvantage is the high cost in CPU cycles for processing the preambles in the gNB and/or eNB. Processing 64 preambles require lots of processing cycles.

SUMMARY

An object of embodiments herein is to improve the performance in a multi Radio Access Technology (RAT) communications network using Spectrum Sharing.

According to an aspect, the object is achieved by a method performed by a network node for processing preambles from a User Equipment, UE, in a Random Access Channel, RACH procedure in a wireless communications network. The network node is configured with a common preamble format for a shared spectrum comprising a first Radio Access Technology, RAT, and a second RAT. The RACH procedure is common for the first RAT and the second RAT. The network node configures the network node with a common preamble location in time and frequency for the first RAT and the second RAT. The network node configures the UE with a preamble group comprising a number of preambles distributed between the first RAT and the second RAT for the common preamble format. When receiving from the UE, a first RACH message comprising a first preamble at the common preamble location according to the UE configuring, the network node decides whether the first RAT, the second RAT, or both the first RAT and the second RAT, shall be used for a second RACH message to be sent to the UE. The decision is based on the distribution of the number of preambles between the first RAT and the second RAT for the common preamble format in the preamble group.

According to another aspect, the object is achieved by a network node configured for processing preambles from a User Equipment, UE, in a Random Access Channel; RACH; procedure in a wireless communications network. The network node is configured with a common preamble format for a shared spectrum comprising a first Radio Access Technology, RAT, and a second RAT. The RACH procedure is adapted to be common for the first RAT and the second RAT. The network node further is configured to:

Configure a common preamble location in time and frequency for the first RAT and the second RAT, in the network node, configure the UE with a preamble group comprising a number of preambles adapted to be distributed between the first RAT and the second RAT for the common preamble format, receive from the UE, a first RACH message comprising a first preamble at the common preamble location adapted according to the UE configuration, and decide whether the first RAT, the second RAT, or both the first RAT and the second RAT, shall be used for a second RACH message to be sent to the UE which decision is adapted to be based on: The first preamble and the distribution of the number of preambles between the first RAT and the second RAT for the common preamble format in the preamble group.

It is furthermore provided herein a computer program product comprising instructions, which, when executed on at least one processor, cause the at least one processor to carry out any of the method above, as performed by the network node. It is additionally provided herein a computer-readable storage medium, having stored therein a computer program product comprising instructions which, when executed on at least one processor, cause the at least one processor to carry out the method according to the method above, as performed by the network node.

BRIEF DESCRIPTION OF THE DRAWINGS

FIGS. 7 to 10 are flowcharts illustrating methods implemented in a communication system including a host computer, a base station and a user equipment.

DETAILED DESCRIPTION

Embodiments herein relate to common preamble processing for spectrum sharing.

Embodiments herein exploit the fact that in SS case, common preamble resource and format may be set for LTE and NR to reduce the preamble processing in a network node gNB/eNB. According to 3GPP only Format 0 is same for both LTE and NR. To achieve a combined preamble process according to an example embodiment, preambles are grouped among LTE and NR for Format 0. Based on preamble group used in msg1 the network node such as gNB and/or eNB is enabled to distinguish which access technology it shall send a msg2. Format 0 when used herein means preamble format according to the first row at the table regarding PRACH preamble formats for $L_{RA}=839$ and $\Delta f^{RA} \in \{1.25,5\}$ kHz.

An advantage of embodiments herein is that common preamble processing will reduce processing cycles and FFT jobs. Another benefit will be increased UL capacity, since it will not be needed to allocate dedicated resources in the UL spectrum for PRACH for both NR and LTE. Instead a common resource may be used.

Figure 1:
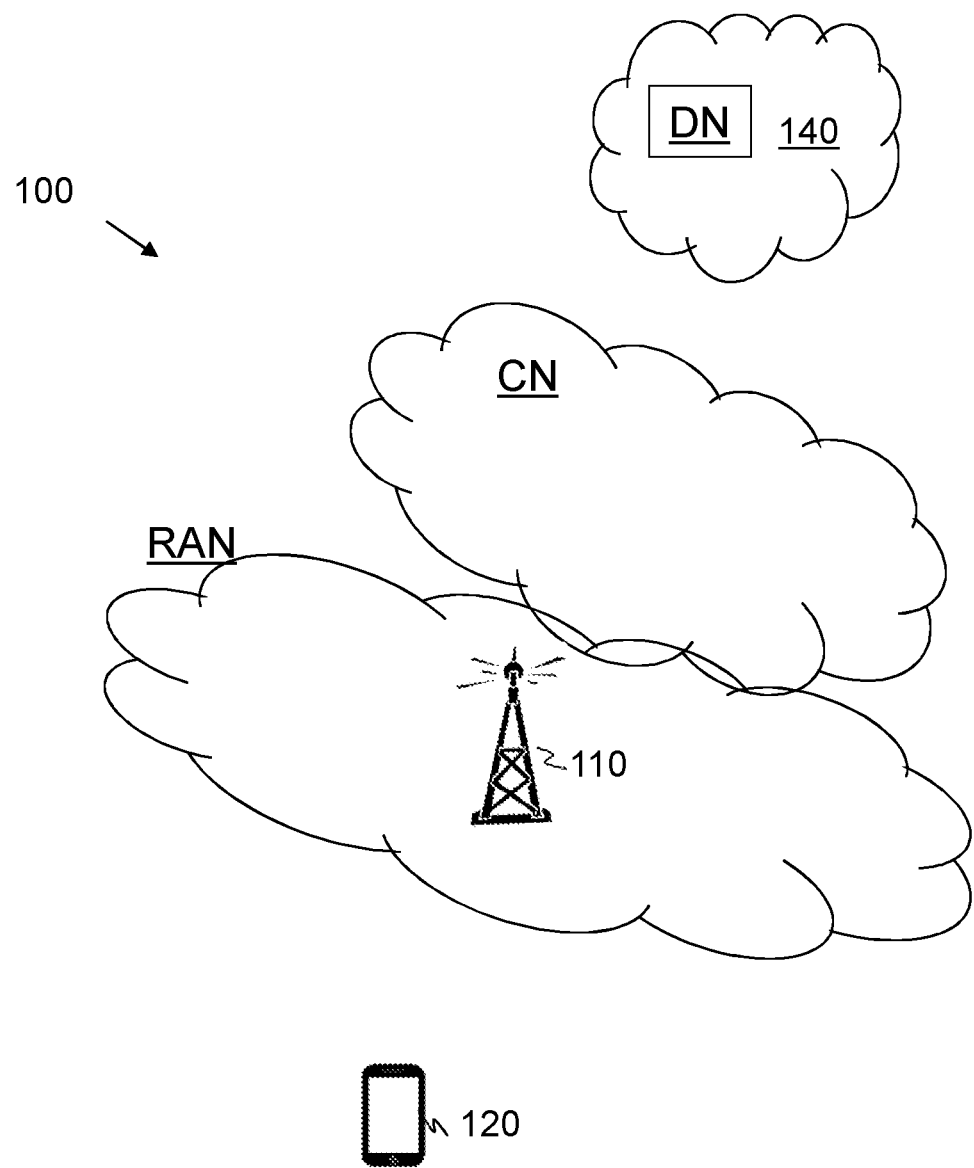
FIG. 1 is a schematic block diagram depicting embodiments of a wireless communications network.

FIG. 1 is a schematic overview depicting a wireless communications network 100 wherein embodiments herein may be implemented. The wireless communications network 100 comprises one or more RANs and one or more CNs. The wireless communications network 100 may use 5 Fifth Generation New Radio, (5G NR) but may further use a number of other different Radio Access Technologies (RAT)s, such as, Wi-Fi, (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. According to some embodiments herein, a first RAT may e.g. be any one out of LTE or NR. A second RAT may e.g. be LTE if the first RAT is NR or NR if the first RAT is LTE.

Network nodes such as a network node 110, also referred to as the network node 110, operates in the wireless communications network 100. The network node 110 provides radio access in one or more cells by providing radio coverage over a geographical area by means of antenna beams. The network node 110 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a UE within the cell served by network node 110 depending e.g. on the radio access technology and terminology used.

Wireless devices such as a UE 120 operate in the wireless communications network 100. The UE 120 may e.g. be an NR device, a mobile station, a wireless terminal, an NB-IoT device, an eMTC device, a CAT-M device, a WiFi device, an LTE device and an a non-access point (non-AP) STA, a STA, that communicates via a base station such as e.g. the network node 110, one or more Access Networks (AN), e.g. RAN, to one or more CNs. It should be understood by the skilled in the art that the UE relates to a non-limiting term which means any UE, terminal, wireless communication terminal, user equipment, (D2D) terminal, or node e.g. smart phone, laptop, mobile phone, sensor, relay, mobile tablets or even a small base station communicating within a cell.

Methods herein may be performed by the network node 110. As an alternative, a Distributed Node (DN) and functionality, e.g. comprised in a cloud 140 as shown in FIG. 1, may be used for performing or partly performing the methods.

Figure 2:
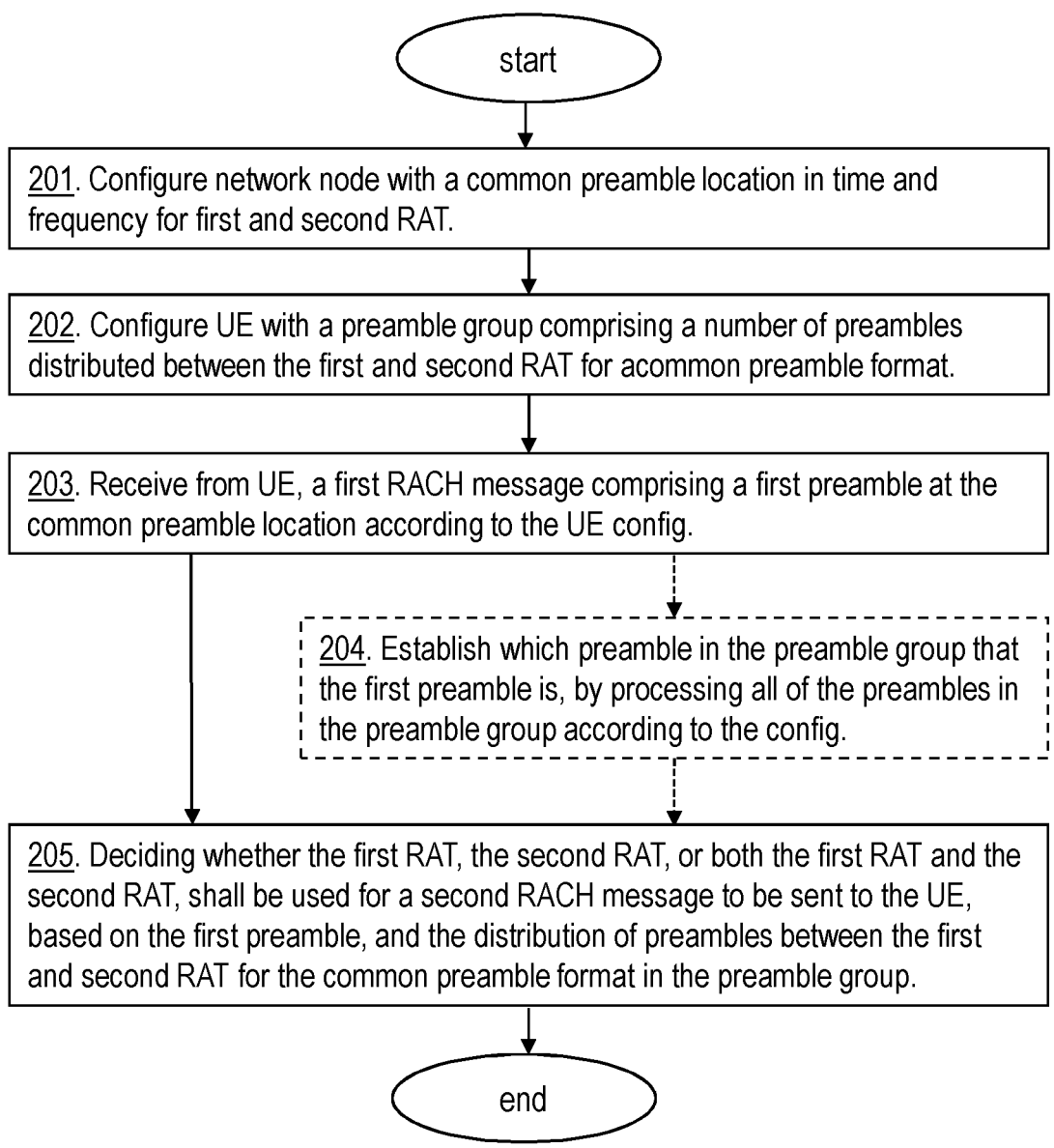
FIG. 2 is a flow chart depicting embodiments of a method in a network node.

FIG. 2 shows example embodiments of a method performed by the network node 110 for processing preambles from the UE 120 in a RACH procedure in the wireless communications network 100. The network node 110 is configured with a common preamble format for a shared spectrum comprising a first RAT, and a second RAT. This means that the shared spectrum is shared between at least the first RAT and the second RAT. In some embodiments, the first RAT is represented by LTE and the second RAT is represented by NR. In some other embodiments, the second RAT is represented by LTE, and the first RAT is represented by NR.

The RACH procedure is common for the first RAT and the second RAT. The common preamble format may e.g. be represented by preamble format 0.

The method comprises one or more of the following actions, which actions may be taken in any suitable order. Actions that are optional are marked with dashed boxes in the figure.

Action 201

The network node 110 configures a common preamble location in time and frequency for the first RAT and the second RAT, in the network node 110. This means that the network node 110 is configured with common preamble location in time and frequency for the first RAT and the second RAT, e.g. for LTE and NR.

This may be referred to as the network node configuration.

Action 202

The network node 110 further configures the UE 120 with a preamble group comprising a number of preambles distributed between the first RAT and the second RAT for the common preamble format. This may be referred to as the UE configuration.

The preamble group may e.g. be represented by preamble group 0. The number of preambles in the preamble group may e.g. comprise 64 preambles.

Option 1. In the configuring of the UE 120 according to some embodiments herein referred to as Option 1, the preamble group comprises a first preamble group for the first RAT and a second preamble group for the second RAT. In these embodiments, the number of preambles distributed between the first RAT and the second RAT comprises: A first part of the number of preambles and a remaining part of the number of preambles. In these embodiments, the first part of the number of preambles is distributed to the first preamble group for the first RAT, and the remaining part of the number of preambles is distributed to the second preamble group for the second RAT.

Option 2. According to some embodiments herein referred to as Option 2, the UE 120 is configured with the preamble group comprising a number of preambles, wherein each preamble is distributed for both first RAT capable UEs and second RAT capable UEs.

Option 3. According to some embodiments herein referred to as Option 3, in configuring 202 the UE 120, with the number of preambles that are distributed between the first RAT and the second RAT, all preambles out of the number of preambles are distributed to the first RAT and a subset of all preambles out of the number of preambles are distributed to the second RAT.

Action 203

The network node 110 receives a first RACH message from the UE 120. The first message may e.g. be represented by an msg1. The first RACH message comprises a first preamble at the common preamble location according to the UE 120 configuring. This means according to the UE configuration.

Action 204

In some embodiments, the network node 110 establishes which preamble out of the number of preambles in the preamble group that the first preamble is. This may be performed by processing all of the number of preambles in the preamble group according to the configuration.

Action 205

The network node 110 decides which RAT to use for the second message based on how the number of preambles in the UE configuration are distributed. When receiving the first RACH message from the UE 120, comprising the first preamble at the common preamble location, the network node 110 decides whether the first RAT, the second RAT, or both the first RAT and the second RAT, shall be used for a second RACH message to be sent to the UE 120. The second message may e.g. be represented by an msg2.

The deciding is based on: The distribution of the number of preambles between the first RAT and the second RAT for the common preamble format in the preamble group.

Option 1. According to the embodiments referred to as Option 1, the first part of the number of preambles is distributed to the first preamble group for the first RAT, and the remaining part of the number of preambles is distributed to the second preamble group for the second RAT. In these embodiments the deciding 205 whether the first RAT, the second RAT, or both the first RAT and the second RAT, shall be used for a second RACH message comprises the following: When an index in the first message is related to the first part of the number of preambles in the first preamble group according to the UE configuration, the network node 110 decides that the first RAT shall be used for the second RACH message. Further, when an index in the first message is related to the remaining part of the number of preambles in the second preamble group according to the UE configuration, the network node 110 decides that the second RAT shall be used for the second RACH message. An index when used herein may mean a preamble index.

Option 2. According to the embodiments referred to as Option 2, each preamble is distributed for both first RAT capable UEs and second RAT capable UEs. In these embodiments the deciding whether the first RAT, the second RAT, or both the first RAT and the second RAT, shall be used for a second RACH message comprises the following: When an index in the first message is related to said preamble group according to the UE configuration, the network node 110 decides that both the first RAT and the second RAT shall be used for the second RACH message.

Option 3. According to the embodiments referred to as Option 3, all preambles out of the number of preambles are distributed to the first RAT and a subset of all preambles out of the number of preambles are distributed to the second RAT. In these embodiments the deciding whether the first RAT, the second RAT, or both the first RAT and the second RAT, shall be used for a second RACH message comprises the following: The network node 110 decides that the first RAT shall be used for the second RACH message, and if the second RAT was configured for the first preamble, the network node 110 decides that the second RAT shall be used for a further second RACH message as well.

The options 1-3 will be described more in detail below.

The embodiments above will now be further explained and exemplified. The example of embodiments below may be combined with any suitable embodiments described above.

Example embodiments herein are applicable for the network node 110 such as e.g. a gNB and/or an eNB, when SS is configured and preamble format 0 is used for both LTE and NR.

According to 3GPP TS 36.211 and TS 38.211 specifications, Format 0 is same for both LTE and NR such as the first RAT and second RAT. And both these Format 0 technologies use up to 64 preambles.

Figure 3:
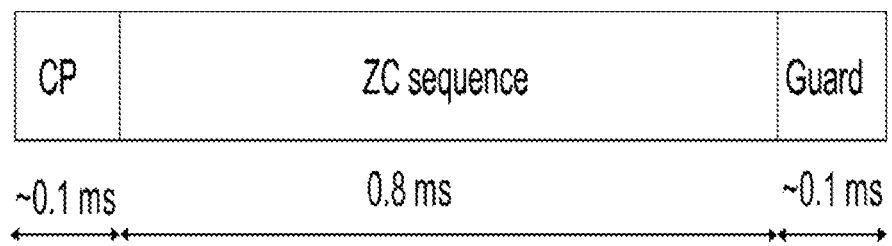
FIG. 3 is a schematic block diagram depicting an embodiment.

FIG. 3: illustrates how a format 0 preamble is constructed which is the same for both LTE and NR such as the first RAT and second RAT.

In the left part of the preamble of FIG. 3, CP means a cyclic prefix and is about 0.1 milliseconds (ms) long.

The middle part of the preamble of FIG. 3, comprises a Zadoff-Chu (ZC) sequence. The ZC sequence is about 0.8 ms long and us used for generating preamble sequences.

In the right part of the preamble of FIG. 3, Guard means guard period and is about 0.1 milliseconds (ms) long. The guard period is used for different propagation delay between the network node 110 such as the gNB and/or eNB and the UE 120.

According to some embodiments herein, the network node 110 will configure the same preamble location, i.e. a common preamble location for both the first RAT and the second RAT, such as both LTE and NR, for preamble Format 0. The same preamble location may e.g. comprise 6 RB, 12*15*6 kHz=1.08 MHz and 1.25 sub-carrier spacing. This means that PRACH resources may configure same time and frequency for both LTE and NR.

This relates to Action 201 described above.

The UE 120 will be configured with a group of preambles for the first RAT and the second RAT such as LTE and NR.

The preamble group comprises a number of preambles distributed between the first RAT and the second RAT. E.g. 64 preambles are distributes between the first RAT and the second RAT according to some distribution that may be different for different embodiments. For example 32 preambles are distributed for the first RAT such as NR and 32 preambles are distributed for the second RAT such as LTE.

This relates to Action 202 described above.

Example of embodiments of the common preamble process described above may e.g. comprise the options 1-3 to be performed by the network node 110 as will be described below. In these examples the first RAT is represented by LTE and the second RAT is represented by NR. Further, the network node 110 may be represented by a gNB and/or an eNB. The first message is represented by msg1 and the second message is represented by msg2.

Option 1.

If shared spectrum between LTE and NR (SS (LTE+NR)) is configured with format 0:

Configure a same preamble location in time and frequency for LTE and NR in the network node 110. The same preamble location may mean the common preamble location. This relates to Action 201 described above.

Configure a preamble group 0 [0,x] for LTE and a group 1 [x+1,63] for NR. This means that the preamble group if comprising 64 preambles, preamble 0 to 63, comprises a first preamble group, group 0 [0,x], i.e. preamble 0-x for LTE, and a second preamble group, group 1 [x+1,63], i.e. preamble x+1 to 63 for the NR. This relates to Action 202 described above.

In some embodiments, the lowest allowed preamble index, which in this example is x+1, for NR UEs may need to be signalled to UE 120.

The network node 110 will process all 64 preambles, and
if the UE 120 sends preamble index that is x, the network node 110 will process msg2 in LTE,
otherwise, the network node 110 will process msg2 in NR This relates to Action 203 and 205 described above.

An advantage with Option 1 is that second RACH message will not be sent to both RATs. The preamble index uniquely identifies the RAT.

Option 2.

If SS (LTE+NR) is configured with format 0:

Configure same preamble location in time and frequency for LTE and NR in the network node 110. The same preamble location may mean the common preamble location. This relates to Action 201 described above.

Configure preamble group 0 (0-63) for both LTE and NR capable UEs. If the preamble group comprises 64 preambles, this means preamble 0 to 63. This relates to Action 202 described above.

The network node 110 will process all 64 preambles, and and msg2 will be sent both in LTE and NR.

This relates to Action 203 and 205 described above.

The UE 120 will send msg3 either by using LTE or NR, based on the UE capabilities. This means whether the UE 120 is capable of sending msg3 by using NR or capable of sending msg3 by using LTE.

An advantage with Option 2 is that no standard change is needed.

Option 3.

If SS (LTE+NR) is configured with format 0,

Configure same preamble location in time and frequency for LTE and NR in the network node 110. The same preamble location may mean the common preamble location. This relates to Action 201 described above.

Configure preamble group 0 (0-63) for LTE and a subset of the preamble group 0 (0-x) for NR. If the preamble group comprises 64 preambles, this means preamble 0 to 63 for LTE and preamble 0-x to NR.

This relates to Action 202 described above.

The network node 110 will process all 64 preambles, and and msg2 will be sent in LTE.

for the common region, i.e. the subset of the preamble group 0 (0-x) msg2 will be sent in NR as well.

This relates to Action 203 and 205 described above.

The UE 120 will send msg3 either by using LTE or NR, based on the UE capabilities.

An advantage with Option 3 is that there is less overhead compared to Option 2.

Figure 4A:
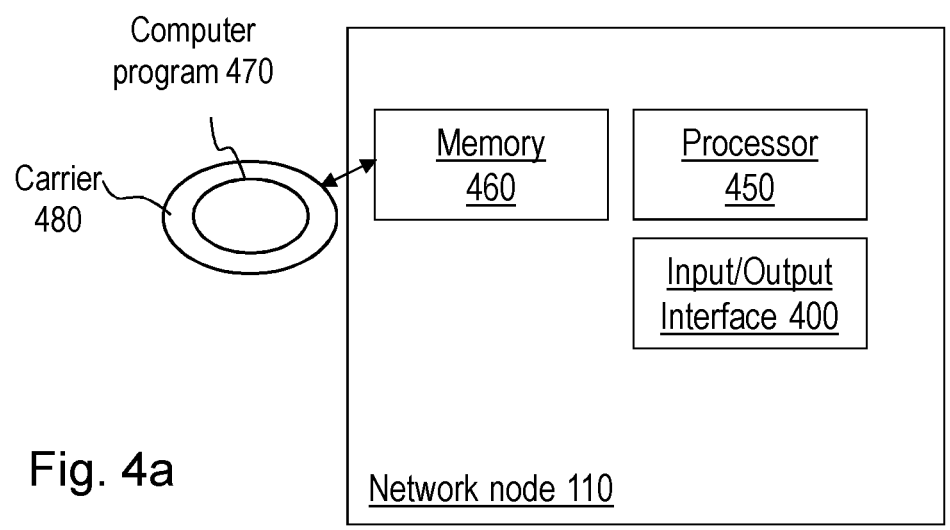
FIGS. 4 *a* and *b* are schematic block diagrams depicting embodiments of a network node.
Figure 4B:
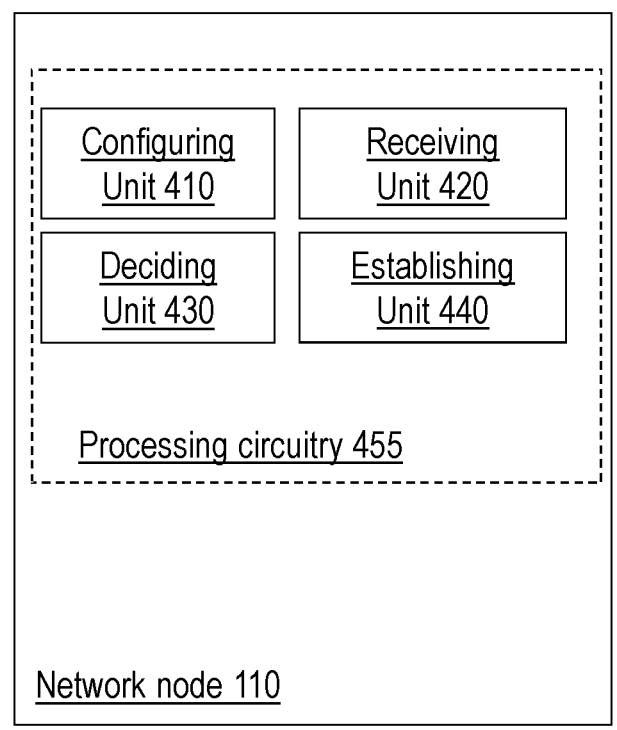

To perform the action as mentioned above, the network node 110 may comprise the arrangement as shown in FIG. 4a and FIG. 4b. The network node 110 is configured to process preambles from the UE 120, in a RACH procedure in the wireless communications network 100. The network node 110 is further configured with a common preamble format for a shared spectrum comprising a first RAT and a second RAT. The RACH procedure is adapted to be common for the first RAT and the second RAT.

In some embodiments any one or more out of:

The first RAT is adapted to be represented by Long term Evaluation, LTE, and the second RAT is adapted to be represented by fifth generation New Radio, NR, or the second RAT is adapted to be represented by LTE, and the first RAT is adapted to be represented by NR.

The network node 110 may comprise an input and output interface 400 configured to communicate with the UE 120 see FIG. 4a. The input and output interface 500 may comprise a wireless receiver (not shown) and a wireless transmitter (not shown).

The network node 110 is further configured to, e.g. by means of a configuring unit 410 in the network node 110, configure a common preamble location in time and frequency for the first RAT and the second RAT, in the network node.

The network node 110 is further configured to, e.g. by means of the configuring unit 410 in the network node 110, configure the UE 120 with a preamble group comprising a number of preambles adapted to be distributed between the first RAT and the second RAT for the common preamble format.

The network node 110 is further configured to, when receiving from the UE 120, e.g. by means of a receiving unit 420 in the network node 110, a first RACH message comprising a first preamble at the common preamble location adapted according to the UE 120 configuring, decide, e.g. by means of a deciding unit 430 in the network node 110, whether the first RAT, the second RAT, or both the first RAT and the second RAT, shall be used for a second RACH message to be sent to the UE 120. The deciding is adapted to be based on the distribution of the number of preambles between the first RAT and the second RAT for the common preamble format in the preamble group.

In some embodiments, e.g. relating to Option 1, the network node 110 may further be configured to, e.g. by means of the configuring unit 410, in the configuring of the UE 120, the preamble group is adapted to comprise a first preamble group for the first RAT and a second preamble group for the second RAT, and the number of preambles distributed between the first RAT and the second RAT is adapted to comprise:

a first part of the number of preambles adapted to be distributed to the first preamble group for the first RAT, and a remaining part of the number of preambles adapted to be distributed to the second preamble group for the second RAT.

In some embodiments e.g. relating to Option 1, the network node 110 may further be configured to decide e.g. by means of the deciding unit 430 whether the first RAT, the second RAT, or both the first RAT and the second RAT, shall be used for a second RACH message by:

when an index in the first message is related to the first part of the number of preambles in the first preamble group according to the UE configuration, decide that the first RAT shall be used for the second RACH message, and when an index in the first message is related to the remaining part of the number of preambles in the second preamble group according to the UE configuration, decide that the second RAT shall be used for the second RACH message.

In some embodiments e.g. relating to Option 2, the network node 110 may further be configured to, e.g. by means of the configuring unit 410, configure the UE 120 with the preamble group comprising the number of preambles distributed between the first RAT and the second RAT for the common preamble format by:

Configuring the UE 120 with the preamble group comprising the number of preambles, wherein each preamble is adapted to be distributed for both first RAT capable UE and second RAT capable UE, and, when an index in the first message is related to said preamble group according to the UE configuration, decide that both the first RAT and the second RAT shall be used for the second RACH message.

In some embodiments e.g. relating to Option 3, the network node 110 may further be configured to, e.g. by means of the configuring unit 410, when configuring the UE 120, the number of preambles to be distributed between the first RAT and the second RAT is further adapted to comprise: all preambles out of the number of preambles being adapted to be distributed to the first RAT and a subset of all preambles out of the number of preambles being adapted to be distributed to the second RAT.

In these embodiments, the network node 110 may further be configured to, e.g. by means of the deciding unit 530, decide whether the first RAT, the second RAT, or both the first RAT and the second RAT, shall be used for a second RACH message by: Deciding that the first RAT shall be used for the second RACH message, and if the second RAT was configured for the first preamble, and decide that the second RAT shall be used for a further second RACH message as well.

The network node 110 may further be configured e.g. by means of an establishing unit 440 in the network node 110, establish which preamble out of the number of preambles in the preamble group that the first preamble is, by the network node 110 by processing all of the number of preambles in the preamble group according to the configuration.

In some embodiments any one or more out of:
The common preamble format is adapted to be represented by preamble format 0,
the preamble group is adapted to be represented by preamble group 0, and
the number of preambles in the preamble group is adapted to comprise 64 preambles.

The embodiments herein may be implemented through a processor or one or more processors, such as the processor 450 of a processing circuitry 455 in the network node 110, depicted in FIGS. 4 a and b, together with computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 460 comprising one or more memory units. The memory 460 comprises instructions executable by the processor in the network node 110. The memory 460 is arranged to be used to store decisions, preamble groups, preamble distributions between the first RAT and the second RAT, data, configurations, and applications to perform the methods herein when being executed in the network node 110.

In some embodiments, a computer program 470 comprises instructions, which when executed by the at least one processor, cause the at least one processor of the network node 110 to perform the actions above.

In some embodiments, a carrier 480 comprises the computer program 470, wherein the carrier 480 is one of an electronic signal, an optical signal, an electromagnetic signal, a magnetic signal, an electric signal, a radio signal, a microwave signal, or a computer-readable storage medium.

Those skilled in the art will also appreciate that the units in the units described above may refer to a combination of analog and digital circuits, and/or one or more processors configured with software and/or firmware, e.g. stored in the network node 110, that when executed by the respective one or more processors such as the processors or processor circuitry described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Further Extensions and Variations

Figure 5:
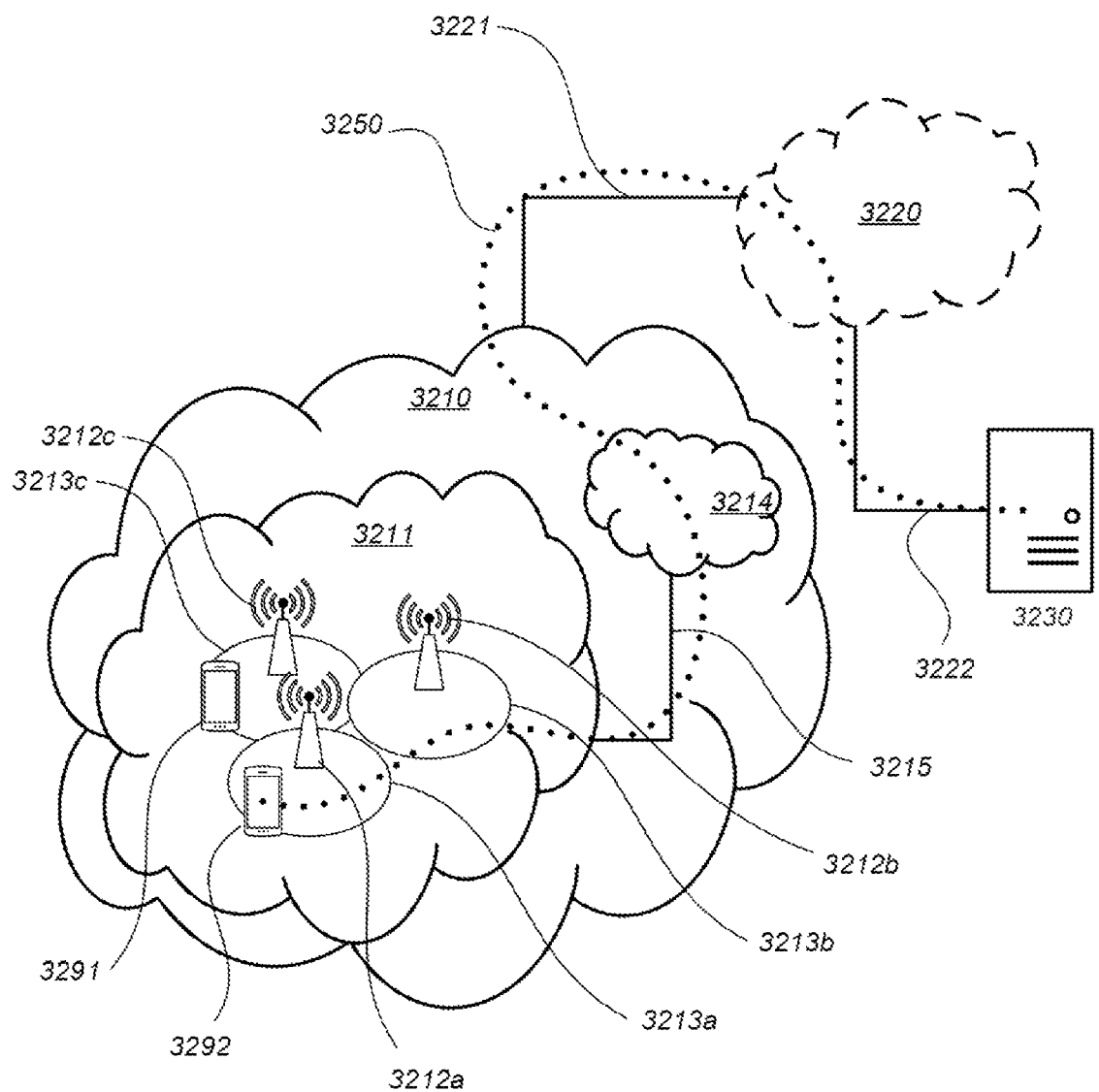
FIG. 5 schematically illustrates a telecommunication network connected via an intermediate network to a host computer.

With reference to FIG. 5, in accordance with an embodiment, a communication system includes a telecommunication network 3210 such as the wireless communications network 100, e.g. an IoT network, or a WLAN, such as a 3GPP-type cellular network, which comprises an access network 3211, such as a radio access network, and a core network 3214. The access network 3211 comprises a plurality of base stations 3212a, 3212b, 3212c, such as the network node 110, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UE 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 5 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 6. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 6) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 6:
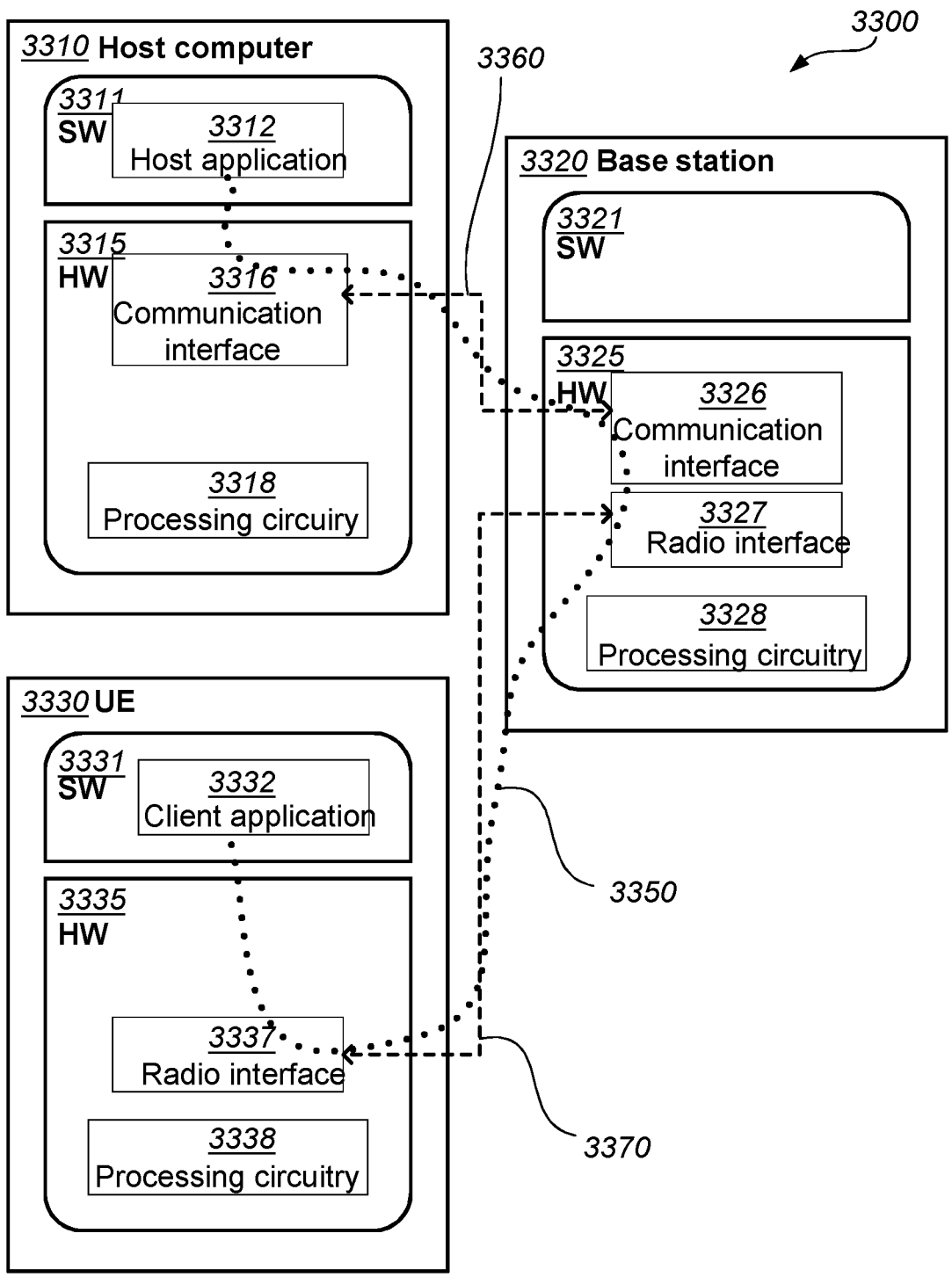
FIG. 6 is a generalized block diagram of a host computer communicating via a base station with a user equipment over a partially wireless connection.

It is noted that the host computer 3310, base station 3320 and UE 3330 illustrated in FIG. 6 may be identical to the host computer 3230, one of the base stations 3212a, 3212b, 3212c and one of the UEs 3291, 3292 of FIG. 7, respectively. This is to say, the inner workings of these entities may be as shown in FIG. 6 and independently, the surrounding network topology may be that of FIG. 5.

In FIG. 6, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 7 is a flowchart illustrating a method implemented in a communication system, in accordance with one embodiment. The communication system includes a host computer, a base station such as the network node 110, and a UE such as the UE 120, which may be those described with reference to FIG. 5 and FIG. 6. For simplicity of the present disclosure, only drawing references to FIG. 7 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 8 is a flowchart illustrating a method implemented in a communication system, in accordance with one embodiment. The communication system includes a host computer, a base station such as a AP STA, and a UE such as a Non-AP STA which may be those described with reference to FIG. 5 and FIG. 6. For simplicity of the present disclosure, only drawing references to FIG. 8 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figure 9:
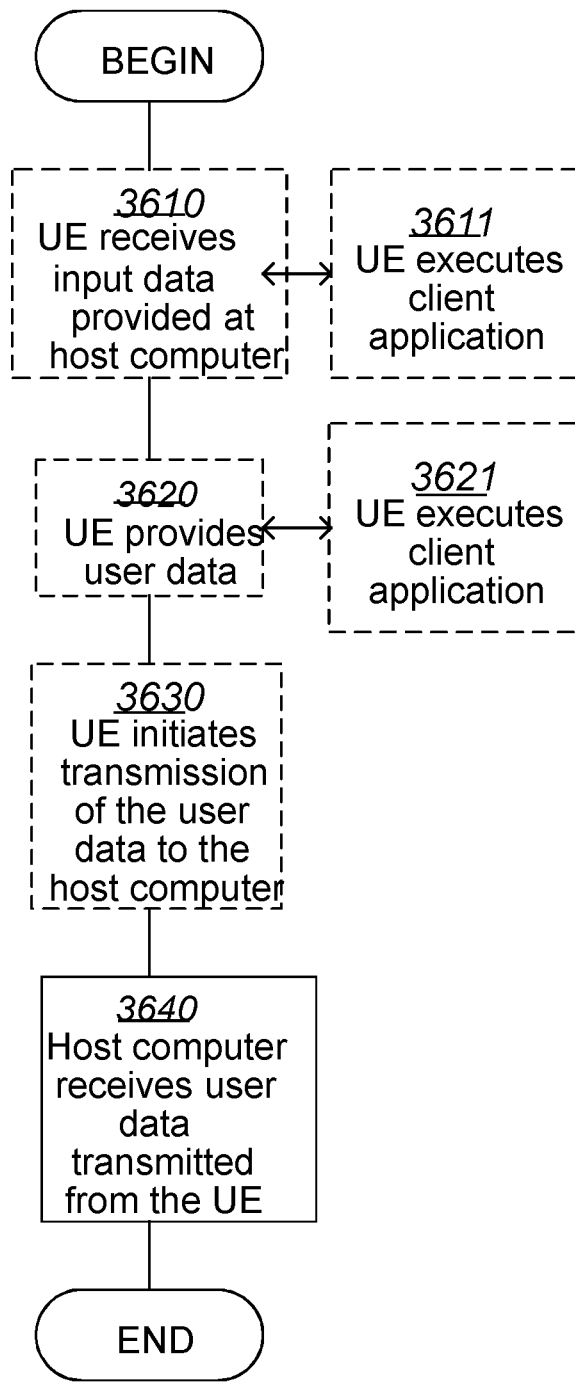
Figure 10:
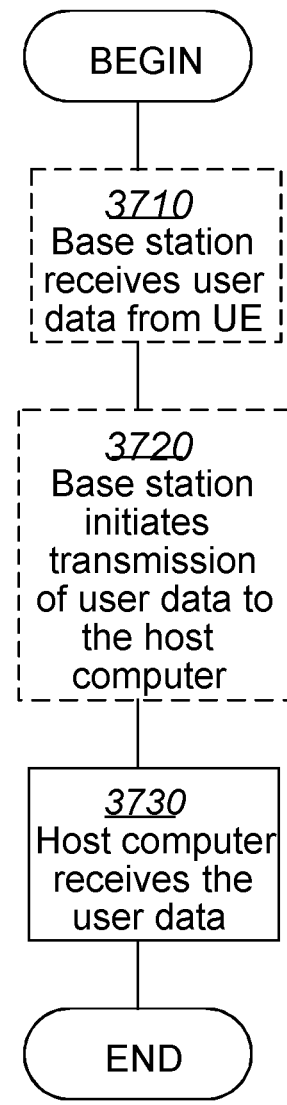

FIG. 9 is a flowchart illustrating a method implemented in a communication system, in accordance with one embodiment. The communication system includes a host computer, a base station such as a AP STA, and a UE such as a Non-AP STA which may be those described with reference to FIG. 5 and FIG. 6. For simplicity of the present disclosure, only drawing references to FIG. 9 will be included in this section.

In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 11 is a flowchart illustrating a method implemented in a communication system, in accordance with one embodiment. The communication system includes a host computer, a base station such as an AP STA, and a UE such as a Non-AP STA which may be those described with reference to FIG. 5 and FIG. 6. For simplicity of the present disclosure, only drawing references to FIG. 11 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

Abbreviation Explanation
LTE Long Term Evolution
NR New Radio
gNB next Generation Node B
eNB eUTRAN Node B
UE User Equipment
RACH Random Access Channel
SI System Information
RRC Radio Resource Control
SS Spectrum Sharing
FFT Fast Fourier Transform
SCell Secondary Cell

The invention claimed is:

1. A method performed by a network node for processing preambles from a User Equipment, UE, in a Random Access Channel; RACH, procedure in a wireless communications network, wherein the network node is configured with a preamble format for a shared spectrum comprising a first Radio Access Technology, RAT, and a second RAT, wherein the preamble format is the same for the first RAT and the second RAT, and wherein the RACH procedure is the same procedure for both the first RAT and the second RAT, the method comprising:
 configuring a preamble location which is the same location in time and frequency for the first RAT and the second RAT, in the network node,
 configuring the UE with a preamble group comprising a number of preambles distributed between the first RAT and the second RAT for the preamble format,
 when receiving from the UE, a first RACH message comprising a first preamble at the preamble location according to the UE configuring, deciding whether a second RACH message is to be sent to the UE using the first RAT, the second RAT, or both the first RAT and the second RAT, wherein deciding is based on:

the distribution of the number of preambles between the first RAT and the second RAT for the preamble format in the preamble group.

2. The method according to claim 1, further comprising:

establishing which preamble out of the number of preambles in the preamble group that the first preamble is, by processing all of the number of preambles in the preamble group according to the configuration.

3. The method according to claim 1, wherein any one or more out of:

the preamble format is represented by preamble format 0, the preamble group is represented by preamble group 0, and the number of preambles in the preamble group comprises 64 preambles.

4. The method according to claim 1, wherein any one out of:

the first RAT is represented by Long term Evaluation, LTE, and the second RAT is represented by fifth generation New Radio, NR, or the second RAT is represented by LTE, and the first RAT is represented by NR.

5. The method according to claim 1, wherein, in configuring the UE:

the preamble group comprises a first preamble group for the first RAT and a second preamble group for the second RAT, the number of preambles distributed between the first RAT and the second RAT comprises:

a first part of the number of preambles is distributed to the first preamble group for the first RAT, and a remaining part of the number of preambles is distributed to the second preamble group for the second RAT.

6. The method according to claim 5, wherein deciding whether the first RAT, the second RAT, or both the first RAT and the second RAT, shall be used for a second RACH message comprises:

when an index in the first RACH message is related to the first part of the number of preambles in the first preamble group according to the UE configuration, deciding that the first RAT shall be used for the second RACH message, and when an index in the first RACH message is related to the remaining part of the number of preambles in the second preamble group according to the UE configuration, deciding that the second RAT shall be used for the second RACH message.

7. The method according to claim 1, wherein configuring the UE with the preamble group comprising a number of preambles distributed between the first RAT and the second RAT for the preamble format comprises:

configuring the UE with the preamble group comprising the number of preambles, wherein each preamble is distributed for both first RAT capable UE and second RAT capable UE, and when an index in the first RACH message is related to said preamble group according to the UE configuration, deciding that both the first RAT and the second RAT shall be used for the second RACH message.

8. The method according to claim 1, wherein:

in configuring the UE, the number of preambles are distributed between the first RAT and the second RAT comprises: all preambles out of the number of preambles are distributed to the first RAT and a subset of all preambles out of the number of preambles are distributed to the second RAT, and wherein deciding whether the first RAT, the second RAT, or both the first RAT and the second RAT, shall be used for a second RACH message comprises:

deciding that the first RAT shall be used for the second RACH message, and if the second RAT was configured for the first preamble, deciding that the second RAT shall be used for a further second RACH message as well.

9. A non-transitory computer-readable storage medium comprising instructions, which when executed by a computer cause the computer to perform actions according to claim 1.

10. A network node configured to process preambles from a User Equipment, UE, in a Random Access Channel; RACH, procedure in a wireless communications network, wherein the network node is configured with a preamble format for a shared spectrum comprising a first Radio Access Technology, RAT, and a second RAT, wherein the preamble format is the same for the first RAT and the second RAT, and wherein the RACH procedure is adapted to be the same procedure for both the first RAT and the second RAT, the network node further being configured to:

configure a preamble location which is the same location in time and frequency for the first RAT and the second RAT, in the network node, configure the UE with a preamble group comprising a number of preambles adapted to be distributed between the first RAT and the second RAT for the preamble format, when receiving from the UE, a first RACH message comprising a first preamble at the preamble location adapted according to the UE configuration, decide whether a second RACH message is to be sent to the UE using the first RAT, the second RAT, or both the first RAT and the second RAT, wherein the decision is adapted to be based on:

the distribution of the number of preambles between the first RAT and the second RAT for the preamble format in the preamble group.

11. The network node according to claim 10, further being configured to:

establish which preamble out of the number of preambles in the preamble group that the first preamble is, by the network node by processing all of the number of preambles in the preamble group according to the configuration.

12. The network node according to claim 10, wherein any one or more out of:

the preamble format is adapted to be represented by preamble format 0, the preamble group is adapted to be represented by preamble group 0, and the number of preambles in the preamble group is adapted to comprise 64 preambles.

13. The network node according to claim 10, wherein any one out of:

the first RAT is adapted to be represented by Long term Evaluation, LTE, and the second RAT is adapted to be represented by fifth generation New Radio, NR, or the second RAT is adapted to be represented by LTE, and the first RAT is adapted to be represented by NR.

14. The network node according to claim 10, wherein, in the configuration of the UE:
the preamble group is adapted to comprise a first preamble group for the first RAT and a second preamble group for the second RAT, and
the number of preambles distributed between the first RAT and the second RAT is adapted to comprise:
a first part of the number of preambles adapted to be distributed to the first preamble group for the first RAT, and
a remaining part of the number of preambles adapted to be distributed to the second preamble group for the second RAT.

15. The network node according to claim 14, further being configured to decide whether the first RAT, the second RAT, or both the first RAT and the second RAT, shall be used for a second RACH message by:
when an index in the first RACH message is related to the first part of the number of preambles in the first preamble group according to the UE configuration, decide that the first RAT shall be used for the second RACH message, and
when an index in the first RACH message is related to the remaining part of the number of preambles in the second preamble group according to the UE configuration, decide that the second RAT shall be used for the second RACH message.

16. The network node according to claim 10, further being configured to configure the UE with the preamble group comprising the number of preambles distributed between the first RAT and the second RAT for the preamble format by:
configuring the UE with the preamble group comprising the number of preambles, wherein each preamble is adapted to be distributed for both first RAT capable UE and second RAT capable UE, and
when an index in the first RACH message is related to said preamble group according to the UE configuration, decide that both the first RAT and the second RAT shall be used for the second RACH message.

17. The network node according to claim 10, further being configured to:
when configuring the UE, the number of preambles to be distributed between the first RAT and the second RAT is further adapted to comprise: all preambles out of the number of preambles being adapted to be distributed to the first RAT and a subset of all preambles out of the number of preambles being adapted to be distributed to the second RAT, and
decide whether the first RAT, the second RAT, or both the first RAT and the second RAT, shall be used for a second RACH message by:
deciding that the first RAT shall be used for the second RACH message, and
if the second RAT was configured for the first preamble, and decide that the second RAT shall be used for a further second RACH message as well.

* * * * *